United States Patent
Jean et al.

(10) Patent No.: US 9,350,145 B2
(45) Date of Patent: May 24, 2016

(54) ROLL-BY SPACER AND TROLLEY SYSTEM FOR USE WITH A WIRE AND METHODS THEREOF

(71) Applicant: Marmon Utility, LCC, Milford, NH (US)

(72) Inventors: Leonard P. Jean, Melbourne, FL (US); Brian Boisclair, Goffstown, NH (US); Jared Argyle, Amherst, NH (US); Bob Biddle, Amherst, NH (US); Edward Laughlin, Lowell, MA (US); Javier Philbrick, Nashua, NH (US)

(73) Assignee: MARMON UTILITY, LLC, Milford, NH (US)

( * ) Notice: Subject to any disclaimer, the term of this patent is extended or adjusted under 35 U.S.C. 154(b) by 476 days.

(21) Appl. No.: 13/768,458

(22) Filed: Feb. 15, 2013

(65) Prior Publication Data
US 2013/0214223 A1     Aug. 22, 2013

Related U.S. Application Data

(60) Provisional application No. 61/601,768, filed on Feb. 22, 2012.

(51) Int. Cl.
 *H02G 1/00* (2006.01)
 *H02G 1/02* (2006.01)
 *H02G 1/04* (2006.01)

(52) U.S. Cl.
 CPC ... *H02G 1/02* (2013.01); *H02G 1/04* (2013.01)

(58) Field of Classification Search
 CPC ..................................... B61B 7/00; B61B 3/00
 USPC ........ 254/134.3 FT, 134.3 R, 134.5; 104/112, 104/113, 114, 115, 116, 117, 117.1
 See application file for complete search history.

(56) References Cited

U.S. PATENT DOCUMENTS

| | | | | |
|---|---|---|---|---|
| 2,983,037 A * | 5/1961 | Hendrix | .................. | 254/134.3 R |
| 3,110,480 A * | 11/1963 | Eitel | ..................... | 254/134.3 R |
| 3,146,994 A * | 9/1964 | Sherman | ................. | 254/134.3 R |
| 3,596,878 A | 8/1971 | Parsen | | |
| 3,672,636 A * | 6/1972 | Parsen | ................... | 254/134.3 R |
| 3,861,650 A | 1/1975 | Jackson | | |
| 3,908,962 A * | 9/1975 | Ross | ..................... | 254/134.3 R |
| 3,970,286 A * | 7/1976 | Ross | ..................... | 254/134.3 R |

(Continued)

FOREIGN PATENT DOCUMENTS

| | | |
|---|---|---|
| JP | 02241303 A | 9/1990 |
| JP | 2004104871 A | 4/2004 |

*Primary Examiner* — Joseph J Hail
*Assistant Examiner* — J Stephen Taylor
(74) *Attorney, Agent, or Firm* — Hayes Soloway, P.C.

(57) ABSTRACT

A roll-by spacer and trolley system for use with a wire and method thereof is provided. The system includes a trolley having at least one rotatable wheel. The rotatable wheel has a first wire contact surface positioned to contact and roll along the wire. A spacer is suspended from the trolley with a connecting element between the trolley and the spacer. The connecting element has a first position wherein the trolley and spacer are connected and a second position wherein the trolley and spacer are disconnected. A wire engagement structure is connected to the spacer. The wire engagement structure has a second wire contact surface that contacts the wire when the connecting element is in the second position. The second wire contact surface is positioned above first wire contact surface when the connecting element is in the first position.

20 Claims, 15 Drawing Sheets

(56) References Cited

U.S. PATENT DOCUMENTS

| | | |
|---|---|---|
| 4,174,678 A | 11/1979 | Van Den Bergh |
| 4,386,759 A | 6/1983 | Grover et al. |
| 4,423,853 A * | 1/1984 | Davis, Sr. .................... 254/390 |
| 4,907,782 A | 3/1990 | Hoekstra |
| 5,064,172 A | 11/1991 | Hereford |
| 5,120,911 A | 6/1992 | Gazzola |
| 5,533,710 A | 7/1996 | Sauber |
| 5,700,980 A | 12/1997 | Bello et al. |
| 5,901,651 A | 5/1999 | Boyd |
| 5,941,507 A | 8/1999 | Page |
| 6,199,829 B1 | 3/2001 | Brown et al. |
| 6,293,520 B1 | 9/2001 | Turner |
| 6,315,269 B1 | 11/2001 | Fleury et al. |
| 6,540,207 B1 | 4/2003 | Barnes |
| 7,323,636 B1 | 1/2008 | Borges et al. |
| 7,874,543 B2 | 1/2011 | Theisen |

* cited by examiner

ROLL-BY SPACER AND TROLLEY SYSTEM FOR USE WITH A WIRE AND METHODS THEREOF

CROSS REFERENCE TO RELATED APPLICATION

This application claims benefit of U.S. Provisional Application Ser. No. 61/601,768, entitled, "Roll-by Spacer and Trolley System for Use with a Wire and Methods Thereof" filed Feb. 22, 2012, the entire disclosure of which is incorporated herein by reference.

FIELD OF THE DISCLOSURE

The present disclosure is generally related to overhead transmission and distribution systems and more particularly is related to a roll-by spacer and trolley system for use with a wire and methods thereof used in overhead transmission and distribution systems.

BACKGROUND OF THE DISCLOSURE

Overhead conductor cables are commonly suspended from a wire typically made of high strength alloys. The wire is supported on poles or towers with the conductor cable spacers arranged at spaced intervals along the wire to suspend one or more conductor cables. The wires are used in part to install cables, such as conductor or transmission and distribution cables commonly used for communication or electrical transmission and distribution. Installation of the cables is a tedious and expensive process, since it conventionally requires the use of numerous different installation devices for installation, and then an exchanging of the installation devices for permanent retention devices.

For example, a utility worker installing a cable may use a roll-by block, messenger trolley and tag line. The messenger trolley may roll along a wire at the front of an installation operation, normally being towed by a pulling rope or other towing device. The messenger trolley is connected to the roll-by block with the tag line which has a predetermined distance, usually 30 feet. Any additional number of roll-by blocks may be used in series, all connected with additional tag lines. The cable being installed is also connected to the messenger trolley and placed within the roll-by block. As the messenger trolley is pulled with the pulling rope along the wire, the cable, tag line and all of the roll-by blocks are also pulled along the wire, with each of the roll-by blocks being spaced apart from one another based on the length of the tag line.

Once the cable is in the desired position and is strung along the length of the wire, a utility worker must remove the roll-by block, the tag line and the messenger trolley and replace these devices with other devices that can be used to permanently hold the cable in place. Permanent holding of the cable may be for an indefinite period of time or any period of time, such as for the months or years the cable may be in place. Normally, this process of changing the roll-by block and other installation devices for permanent devices includes tying off or connecting the end of the cable that was attached to the messenger trolley to a utility pole or a point on the utility pole. Then, a utility worker must go to each of the roll-by blocks and install a spacer prior to removing the roll-by blocks. The spacer is suspended from the wire and holds the cables in a predetermined arrangement. Each of the roll-by blocks must be removed and replaced with a spacer, which can be a lengthy and expensive process, due to the time it takes a utility worker to go back to each of the roll-by blocks.

The use of these many installation and permanent retention components comes at a high cost to utility companies. These costs are from both the use of numerous pieces of installation equipment coupled with the expense in installation hours. The time it takes to install the cables adds significant costs to the operational budgets of the utility companies, which is passed along to the consumer in the form of higher utility bills.

Thus, a heretofore unaddressed need exists in the industry to address the aforementioned deficiencies and inadequacies.

SUMMARY OF THE DISCLOSURE

Embodiments of the present disclosure provide a roll-by spacer and trolley system for use with a wire and methods thereof. Briefly described, in architecture, one embodiment of the system, among others, can be implemented as follows. The roll-by spacer and trolley system for use with a wire has a trolley having at least one rotatable wheel having a first wire contact surface positioned to contact and roll along the wire. A spacer is removably suspended from the trolley with at least one connecting element positioned between the trolley and the spacer, wherein the connecting element has at least a first position wherein the trolley and spacer are connected and a second position wherein the trolley and spacer are disconnected. A wire engagement structure is connected to the spacer, the wire engagement structure having a second wire contact surface positioned to contact the wire when the connecting element is in the second position, wherein the second wire contact surface is positioned above the first wire contact surface when the connecting element is in the first position.

The present disclosure can also be viewed as providing a roll-by spacer for use with a transmission and distribution system. In this regard, one embodiment of such a system, among others, can be implemented as follows. A spacer body having a plurality of arms is sized to receive and carry a cable. A connecting element is connected to the spacer body at a connection point within a proximal end of the connecting element. A wire engagement structure is integrally formed within the connecting element at a distal end. An offset portion is within a middle of the connecting element, wherein the middle of the connecting element is positioned between the proximal and distal ends, and wherein the offset portion is positioned nonlinear relative to the connection point and the wire engagement structure. A trolley connecting structure is formed proximate to the distal end of the connecting element, wherein the trolley connecting structure is engagable with a trolley.

The present disclosure can also be viewed as providing a method of stringing a cable using a roll-by spacer and trolley system on a wire. In this regard, one embodiment of such a method, among others, can be broadly summarized by the following steps: positioning a trolley having at least one rotatable wheel on the wire; suspending a spacer from the trolley with at least one connecting element positioned between the trolley and the spacer; stringing at least one cable through an arm of the spacer; moving the trolley and the spacer along a length of the wire; and releasing the at least one connecting element to disconnect the spacer from the trolley, thereby dropping the spacer onto the wire.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
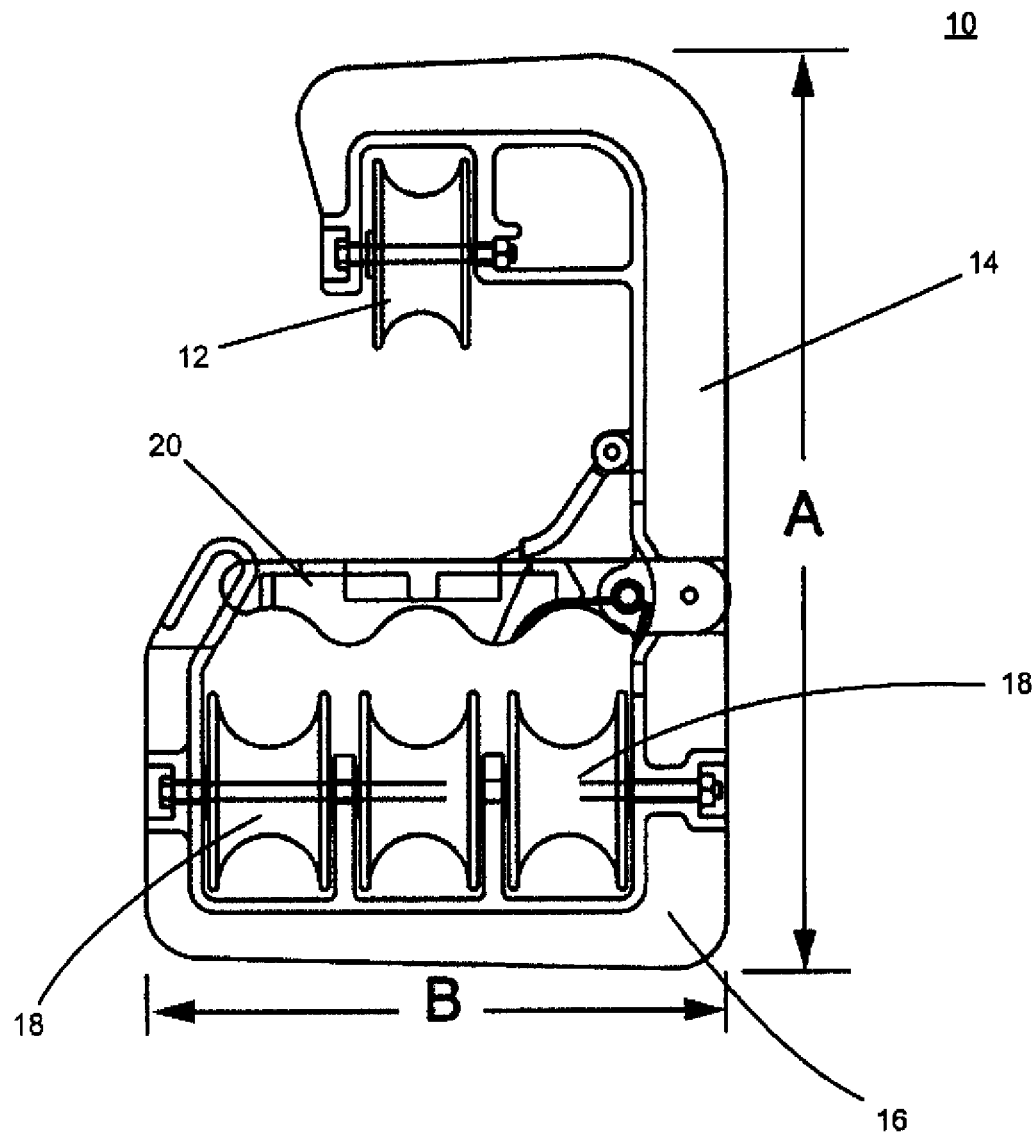
FIG. 1 is a side view illustration of a roll-by block, in accordance with the prior art.

FIG. 1 is a side view illustration of a roll-by block 10, in accordance with the prior art. The roll-by block 10 is conventionally used during an installation process of cables and wires, commonly utility cables such as those used in the transmission and distribution of electrical power or for communication. The roll-by block 10 is used for installing a cable, but must be replaced with other equipment for permanent support of the cable along the messenger wire and utility poles. As is shown in FIG. 1, the roll-by block 10 has a first wheel 12 which rolls along a messenger wire. An arm 14 connects the first wheel 12 to the cable support portion 16, which includes any number of cable wheels 18 (three are shown). The cable support portion 16 may include an openable gate 20 that can be used to insert or remove the cable from the roll-by block 10.

In use, the roll-by block 10 may be used with a messenger trolley and a tag line. The messenger trolley may roll along a messenger wire at the front of an installation operation, normally being towed by a pulling rope or other towing device. The messenger trolley is connected to the roll-by block 10 with the tag line which has a predetermined distance, usually 30 feet. Any additional number of roll-by blocks 10 may be used in series, all connected with additional tag lines. The cable being installed is also connected to the messenger trolley and placed within the cable support portion 16 on the cable wheels 18 of the roll-by block 10. As the messenger trolley is pulled with the pulling rope along the messenger wire, the cable, tag line and all of the roll-by blocks 10 are also pulled along the messenger wire, with each of the roll-by blocks 10 being spaced apart from one another based on the length of the tag line.

Once the cable is in the desired position and is strung along the length of the messenger wire, a utility worker must remove the roll-by block 10, the tag line and the messenger trolley and replace these devices with other devices that can be used to permanently hold the cable in place. Permanent holding of the cable may be for an indefinite period of time or any period of time, such as for the months or years the cable may be in place. Normally, this process of changing the roll-by block 10 and other installation devices for permanent devices includes tying off or connecting the end of the cable that was attached to the messenger trolley to a utility pole or a point on the utility pole. Then, a utility worker must go to each of the roll-by blocks 10 and install a spacer prior to removing the roll-by blocks 10. The spacer is suspended from the messenger wire and holds the cables in a predetermined arrangement, as is well known in the art. Each of the roll-by blocks 10 must be removed and replaced with a spacer, which can be a lengthy and expensive process, due to the time it takes a utility worker to remove each of the roll-by blocks 10, store each of them and replace each of them with a spacer.

Figure 2:
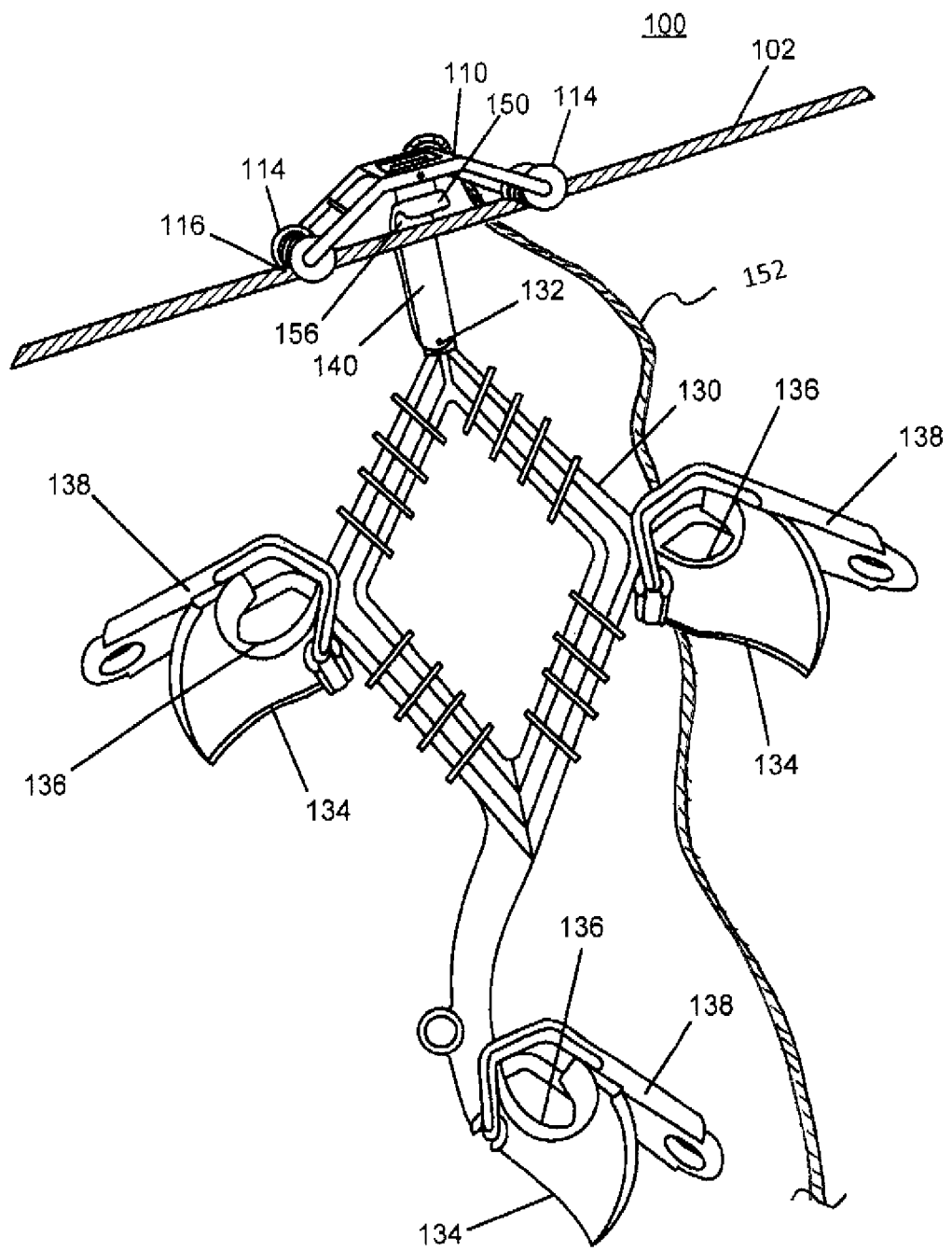
FIG. 2 is a plan view illustration of a roll-by spacer and trolley system, in accordance with a first exemplary embodiment of the present disclosure.

FIG. 2 is a plan view illustration of a roll-by spacer and trolley system 100, in accordance with a first exemplary embodiment of the present disclosure. The roll-by spacer and trolley system which may be referred to herein simply as 'system 100' includes a trolley 110 having at least two rotatable wheels 114. Each of the rotatable wheels 114 has a first messenger wire contact surface 116 positioned to contact and roll along the messenger wire 102. A spacer 130 is removably suspended from the trolley 110 with at least one connecting element 140 positioned between the trolley 110 and the spacer 130. The connecting element 140 has at least a first position wherein the trolley 110 and spacer 130 are connected (shown in FIG. 2) and a second position wherein the trolley 110 and spacer 130 are disconnected (shown in FIG. 3). A messenger wire engagement structure 150 is connected to the spacer 130, wherein the messenger wire engagement structure 150 has a second messenger wire contact surface 156 positioned to contact the messenger wire 102 when the connecting element 140 is in the second position. The second messenger wire contact surface 156 is positioned above the first messenger wire contact surface 116 when the connecting element 140 is in the first position.

As is shown in FIG. 2, the system 100 is used with stringing and retaining a cable commonly used with utility transmission and distribution to conduct electricity. The system 100 is used in connection with the messenger wire 102, also known in the industry as a messenger cable or a catenary, which is a durable wire structure that is used to support cable, such as a conductor cable or transmission and distribution cables. The messenger wire 102 may be constructed from many different materials, or combinations there, but may commonly be constructed from high strength steel wire, other high strength alloys, or a similar material that has high strength characteristics and is durable under many weather conditions. In accordance with this disclosure, the messenger wire 102 may include any type of wire or stringing device used to support another cable.

FIG. 2 illustrates the system 100 in use during an installation process of a cable (not shown). The trolley 110 is positioned on the messenger wire 102 such that each of the rotatable wheels 114 is contacting the messenger wire 102. The portion of the rotatable wheels 114 that contacts the messenger 102 may be characterized as a first messenger wire contact surface 116. In other words, the first messenger wire contact surface 116 is the portion of the rotatable wheel 114 that is in contact with the messenger wire 102 when the trolley 110 is positioned on the messenger wire 102. As one having ordinary skill in the art can see, the first messenger wire contact surface 116 changes as the trolley 110 is moved along the length of the messenger wire 102, since the portion of the rotatable wheels 114 that contacts the messenger wire 102 changes.

A spacer 130 may be suspended from the trolley 110 via a connecting element 140. The connecting element 140 may be engaged or positioned between the trolley 110 and the spacer 130. This may include removable connections between the connecting element 140 and the spacer 130, and/or permanent connections between the connecting element 140 and the spacer 130, such as a connecting element 140 that is integrally connected with the space 130 (discussed further with respect to FIG. 8). In FIG. 2, the connecting element 140 is illustrated as a separate structure from the spacer 130, and connected to the spacer 130 with a pin or bolt connection 132. The spacer 130 may include any type of cable spacer, including those that are known in the art. The spacer 130 may have a number of arms 134, each of which has a saddle 136 for holding a cable. The saddles 136 may also include a retaining device 138 for retaining the cable within the saddle 136. The spacer 130 may be any size and include any configuration, including all configurations known in the art.

Figure 3:
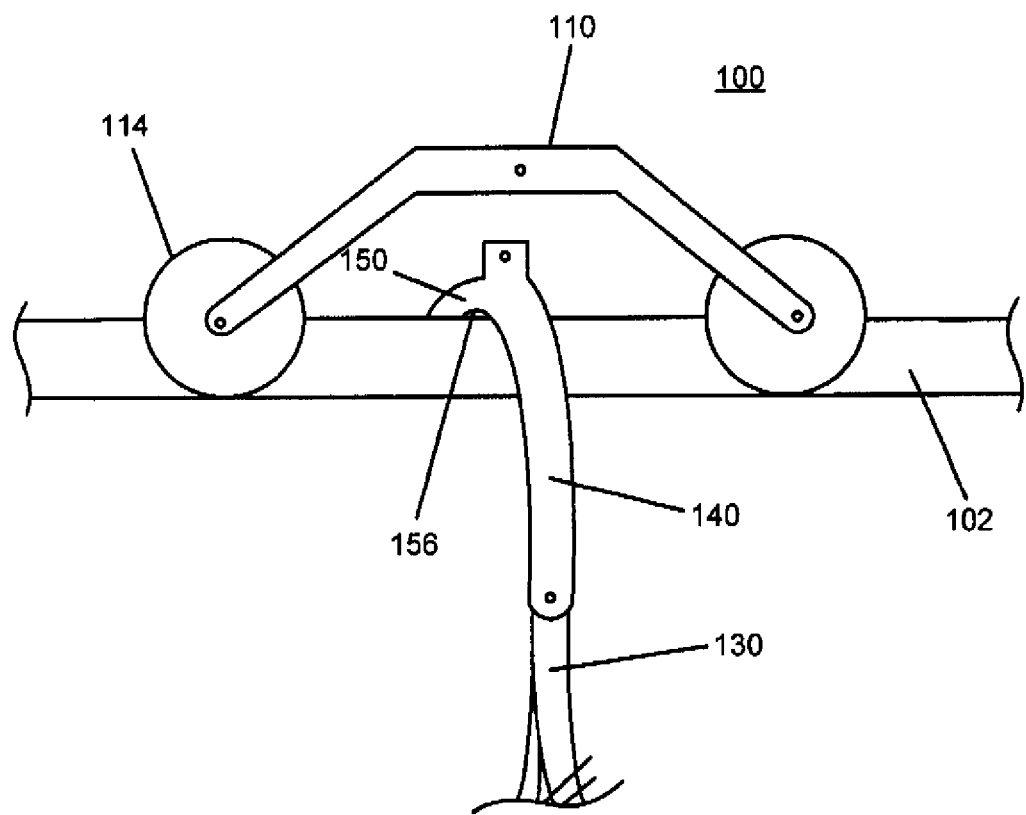
FIG. 3 is a side view illustration of the roll-by spacer and trolley system, in accordance with the first exemplary embodiment of the present disclosure.

The connecting element 140 may removably connect the spacer 130 to the trolley 110, such that it has at least two positions: a first position where the trolley 110 and the spacer 130 are connected together, as is shown in FIG. 2, and a second position where the trolley 110 and the spacer 130 are not connected together, as is shown in FIG. 3. The connecting element 140 may include a variety of different devices or structures to facilitate the first and second positions. For example, the connecting element 140 may use a male and female connection system which uses a pin for retaining the spacer 130 to the trolley 110 in the first position. In this example, the pin may be removed to allow the male portion of the male and female connection system to be released from the female portion. This allows the connecting element 140 to be separated or disconnected from the trolley 110, thereby allowing the connecting element 140 and/or spacer 130 to be positioned on the messenger wire 102 without use of the trolley 110.

The system 100 further includes a messenger wire engagement structure 150 having a second messenger wire contacting surface 156. The messenger wire engagement structure 150 may preferably be connected to the connecting element 140, and more preferably integrally formed within the connecting element 140, as is shown in FIG. 2. However, the messenger wire engagement structure 150 may also be connected to the spacer 130, either with or without the connecting element 140. For example, when the connecting element 140 is formed integral with the spacer 130 or is removably connected with the spacer 130, the messenger wire engagement structure 150 may be formed within the upper portion of the connecting element 140, such that the messenger wire engagement structure 150 can retain the spacer 130 on the messenger wire 102 when the spacer 130 is disconnected from the trolley 110.

The second messenger wire contacting surface 156 of the messenger wire engagement structure 150 may be located on a portion of the messenger wire engagement structure 150 that contacts the messenger wire 102 when the connecting element 140 is disconnected from the trolley 110, i.e., when it is in the second position. In other words, the second messenger wire contacting surface 156 may be the portion of the messenger wire engagement structure 150 that directly contacts the messenger wire 102. For example, as is shown in FIG. 2 the messenger wire engagement structure 150 includes a hook shaped structure wherein the second messenger wire contacting surface 156 is positioned along an interior of the hook shaped structure. This configuration allows the second messenger wire contacting surface 156 to directly contact the messenger wire 102 when the connecting element 140 is disconnected from the trolley 110.

As is shown in FIG. 2, the second messenger wire contact surface 156 is positioned above first messenger wire contact surface 116 on the rotatable wheels 114 when the connecting element 140 is in the first position. This allows the second messenger wire contact surface 156 to be positioned above the messenger wire 102 when the trolley 110 is being moved along the messenger wire 102. The second messenger wire contact surface 156 may be positioned any distance above the messenger wire 102 and any distance above the first messenger wire contact surface 116. For example, as is shown in FIG. 1, the second messenger wire contact surface 156 may be positioned a few centimeters above the messenger wire 102 and the first messenger wire contact surface 116.

The system 100 provides significant benefits over the prior art. One benefit of the system 100 is that the cable may be strung and retained along a messenger wire 102 without exchanging installation devices for permanent retention devices. This saves time and costs associated with installation of new cables. Although a utility worker will still need to visit each spacer 130 after it is hung to release it from the trolley 110 or otherwise adjust it, this second step is easier than replacing a conventional roll-by block with a conventional spacer. Additionally, the positioning of the second messenger wire contact surface 156 above the first messenger wire contact surface 116 in the system 100 when the connecting element 140 is in the first position (connected to the trolley 110) also provides significant benefits over conventional systems. When the spacer 130 is moved to the desired position along the messenger wire 102, the connecting element 140 may be easily moved from the first position to the second position. This can be accomplished remotely from the location proximate to the spacer 130, such as from ground level as opposed to the height at which the messenger wire 102 is located. When the connecting element 140 is moved to the second position, gravitational forces will carry the spacer 130, connecting element 140, and messenger wire engagement structure 150 towards the messenger wire 102, thereby allowing the second messenger wire contact surface 156 to contact the messenger wire 102 and hold the spacer 130 in place on the messenger wire 102. Thus, the spacer 130 can be efficiently transitioned from an installation device to a permanent cable retention structure without significant labor.

FIG. 3 is a side view illustration of the roll-by spacer and trolley system 100 of FIG. 2, in accordance with the first exemplary embodiment of the present disclosure. In particular, FIG. 3 illustrates the connecting element 140 in the second position where the connecting element 140 is disconnected from the trolley 110. As can be seen, the messenger wire engagement structure 150 retains the connecting element 140 and the spacer 130 connecter thereto on the messenger wire 102. In this position, the second messenger wire contact surface 156 of the messenger wire engagement structure 150 may contact the messenger wire 102 directly. The weight of the spacer 130, any cables placed within the spacer 130, and the connecting element 140 may be easily supported by the messenger wire engagement structure 150. The trolley 110 may be removed from its position on the messenger wire 102 and stored for later use, whereas the messenger wire engagement structure 150, connecting element 140, spacer 130 and cables may be retained from the messenger wire 102 for any period of time.

Figure 4:
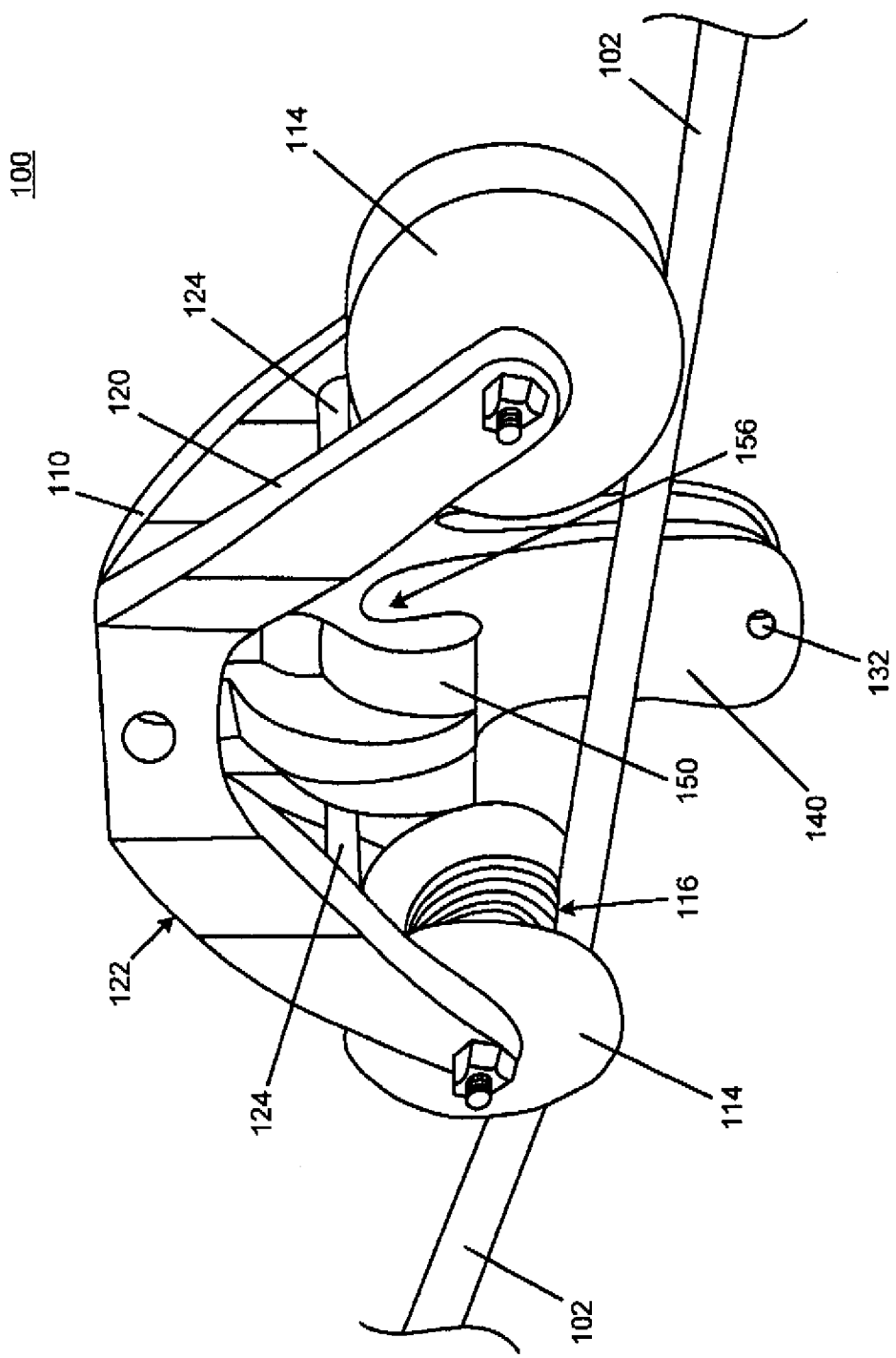
FIG. 4 is a plan view illustration of the trolley, connecting element, and messenger wire engagement structure of the roll-by spacer and trolley system, in accordance with the first exemplary embodiment of the present disclosure.

FIG. 4 is a plan view illustration of the trolley 110, connecting element 140, and messenger wire engagement structure 150 of the roll-by spacer and trolley system 100, in accordance with the first exemplary embodiment of the present disclosure. FIG. 4 illustrates the system 100 without the spacer 130 attached to the connecting element 140. As can be seen, the rotatable wheels 114 of the trolley 110 each have a first messenger wire contact surface 116 positioned on an interior portion of the rotatable wheels 114. Although the specific design and configuration of the trolley 110 may vary, the rotatable wheels 114 may be supported with a yoke structure having a first pair of arms 120 supporting one of the rotatable wheels 114, and a second pair of arms 122 supporting the other rotatable wheel 114. The first and second pair of arms 120, 122 may each extend away from and downward of a center portion of the trolley 110. This allows the rotatable wheels 114 to be positioned below the center portion of the trolley 110. The rotatable wheels 114 may be affixed with any type of axle, such as a bolt or bearing device. Any number of support structures 124 may be used to increase the strength and structural fortitude of the trolley 110.

The connecting element 140 may contact and engage with the trolley 110 at the center portion of the trolley 110. In FIG. 4, the connecting element 140 is shown in an engaged position with the trolley 110, wherein a protrusion or male portion of the connecting element 140 is received in a receiving element or female structure within the trolley 110. Any number of holes in any orientation may be included within the trolley 110 to facilitate engagement with the connecting element 140 or any other structure. As is shown, the first and second pair of arms 120, 122 may be spaced to provide enough space within the trolley 110 for the connecting to element 140 to be positioned approximately between the rotatable wheels 114. Additionally, the first and second pair of arms 120, 122 may orient the center portion of the trolley 110 sufficiently above the rotatable wheels 114 and the first messenger wire contacting surface 116, such that the second messenger wire contact surface 156 of the messenger wire engagement structure 150 is positioned above the first messenger wire contact surface 116.

The connecting element 140 may also have a variety of different designs and structures, many of which may vary from what is illustrated in FIG. 4. For example, the connecting element 140 may include an offset portion within the main body of the connecting element 140. The offset portion allows the connecting element 140 to bow to one side of the messenger wire 102, such that the connecting element 140 does not contact or otherwise negatively interfere with the messenger wire 102 or support structure 124 when the trolley 110 is being moved along the messenger wire 102. This offset portion may orient the end of the connecting element 140 with a pin or bolt connection 132 to one side of the messenger wire 102.

The messenger wire engagement structure 150 is shown in FIG. 4 having a hook structure which is sized to fit around the messenger wire 102 when the connecting element 140 is in the second position. In other words, when the connecting element 140 is placed in the second position, the messenger wire 102 may move into the hook structure of the messenger wire engagement structure 150 and be retained therein. In this position, the messenger wire 102 will contact the second messenger wire contact surface 156, which is positioned on the interior surface of the messenger wire engagement structure 150. The size of the messenger wire engagement structure 150 may vary and may be dependent on the type and size of the messenger wire 102 being used with the system 100.

As one having skill in the art can understand from FIG. 4, when the connecting element 140 is in the first position, the messenger wire 102 will contact the rotatable wheels 114 at the first messenger wire contact surface 116. When the messenger wire 102 contacts the first messenger wire contact surface 116, the messenger wire 102 will be positioned relatively below the messenger wire engagement structure 150, but it will not contact the second messenger wire contact surface 156 due to the distance between the second messenger wire contact surface 156 and the first messenger wire contact surface 116. When the connecting element 140 is disconnected from the trolley 110, the connecting element 140 and messenger wire engagement structure 150 will fall towards the messenger wire 102 until the messenger wire 102 contacts the second messenger wire contact surface 156.

Figure 5:
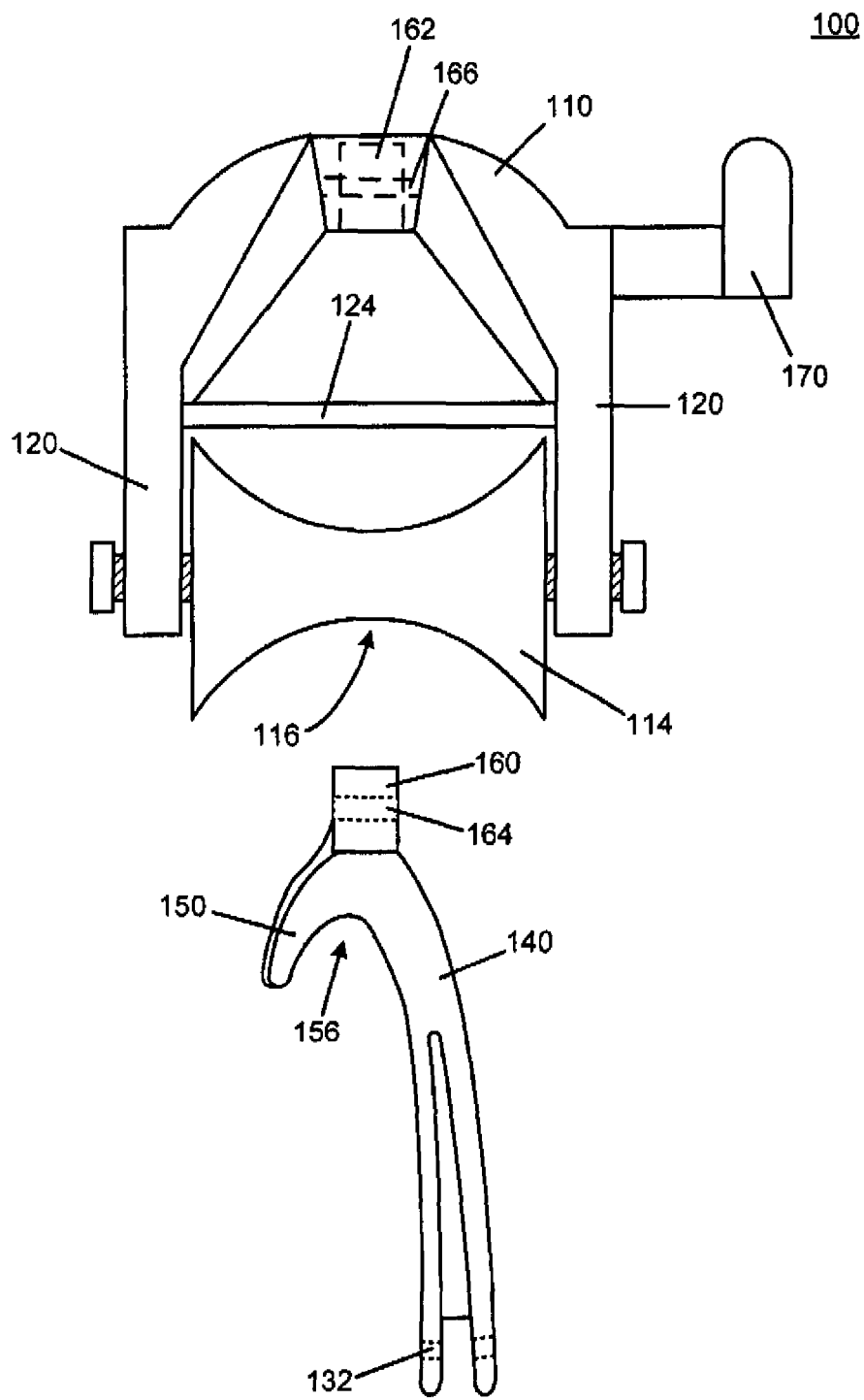
FIG. 5 is a side view illustration of the trolley, connecting element, and messenger wire engagement structure of the roll-by spacer and trolley system, in accordance with the first exemplary embodiment of the present disclosure.

FIG. 5 is a side view illustration of the trolley 110, connecting element 140, and messenger wire engagement structure 150 of the roll-by spacer and trolley system 100, in accordance with the first exemplary embodiment of the present disclosure. A protrusion structure 160 is within the messenger wire engagement structure 150 and a receiving structure 162, indicated with broken lines, is within the trolley 110. The protrusion structure 160 and receiving structure 162 may also be known as a male and female connection system, such that the male structure is the protrusion structure 160 and the female structure is the receiving structure 162. Accordingly, the connecting element 140 may connect to the trolley 110 in the first position with the protrusion structure 160 being inserted or positioned within the receiving structure 162. As can be seen, the protrusion structure 160 may fit within the receiving structure 162, thereby allowing the connecting element 140 and messenger wire engagement structure 150 to be connected to the trolley 110.

The protrusion structure 160 and receiving structure 162 may be retained in the first position with a pin retaining structure. This pin retaining structure may utilize a pin inserted in a hole 164 within the protrusion structure 160 and a hole 166 within the receiving structure 162 and the center portion of the trolley 110. Of course, similar structures may be used in place of the hole 166, such as a notch, a slot, a groove, and/or a mechanical device in any orientation. In FIG. 5, the holes 164, 166 are indicated with broken lines. As can be seen, holes 164, 166 may be axially aligned when the protrusion structure 160 is inserted fully within the receiving structure 162. When this occurs, the pin may be inserted into both of the holes 164, 166, and retained in place, such as with a cotter pin, threaded fastener, integral spring loaded ball, or other device. Once the pin is inserted into the holes 164, 166, the connecting element 140 and messenger wire engagement structure 150 may be connected to the trolley 110 (in the first position). When the pin is removed from the holes 164, 166, the protrusion structure 160 may slide out of the receiving structure 162, thereby disconnecting the connecting element 140 and messenger wire engagement structure 150 from the trolley 110 (in the second position).

A pin that is inserted within the holes 164, 166 may be removed by a utility worker directly. However, the pin may also be removed by a utility worker or device that is positioned remote from the trolley 110, the connecting element 140, and messenger wire engagement structure 150. The pin may be affixed to or in mechanical communication with a pin removal device 152 that facilitates removal of the pin from a remote position. The pin removal device 152, for example, may be a rope attached to the pin that can be pulled on from a ground position or another position remote from the pin. Other pin removal devices may include electro-mechanical actuators or springs or biasing mechanism which facilitate removal of the pin from the remote location. In use, once the trolley 110 is positioned in the desired location along the messenger wire 102 (not shown in FIG. 5), the pin removal device 152 may be engaged to remove the pin, thereby allowing the messenger wire engagement structure 150 to contact the messenger wire 102 at the second messenger wire contact surface 156.

Also shown in FIG. 5 is a line-pull structure 170 sized to connect to a pull line or tag line for moving the trolley 110 along the messenger wire. The line-pull structure 170 may include any structure or combination of structures that a tag line can be affixed to. For example, in FIG. 5, the line-pull structure may include a vertical protrusion that a tag line can be affixed to. Once the tag line is affixed to the line-pull structure 170, a utility worker can move the tag line along the direction of the messenger wire 102 to move the trolley 110. Accordingly, the line-pull structure 170 may allow the trolley 110 and any components of the system 100 suspended therefrom to be positioned at any location along the length of the messenger wire 102.

Figure 6:
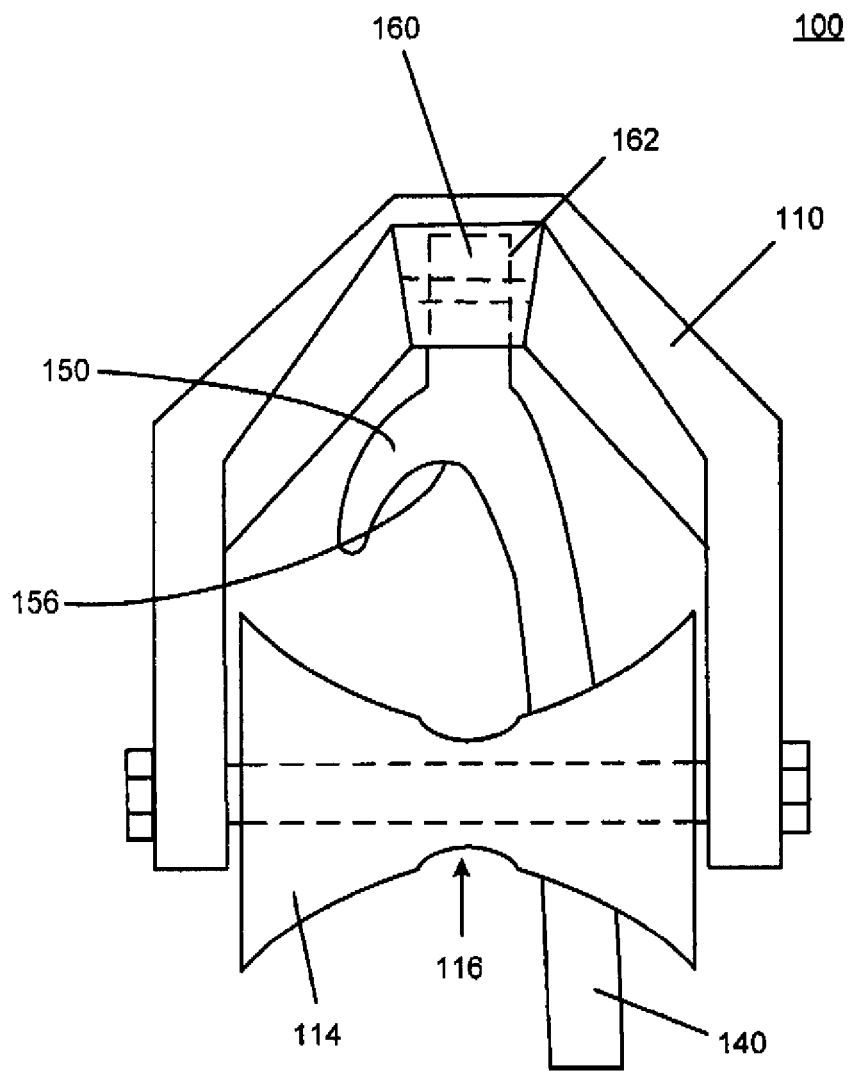
FIG. 6 is a side view illustration of the trolley in the first position with the connecting element of the roll-by spacer and trolley system, in accordance with the first exemplary embodiment of the present disclosure.

FIG. 6 is a side view illustration of the trolley 110 in the first position with the connecting element 140 of the roll-by spacer and trolley system 100, in accordance with the first exemplary embodiment of the present disclosure. In particular, the connecting element 140 is shown connected to the trolley 110 (first position) with the protrusion structure 160 being positioned within the receiving structure 162. In this position, the trolley 110 may be moved along the messenger wire 102 during a cable installation process. As can be seen, the second messenger wire contact surface 156 is positioned above the first messenger wire contact surface 116 of the rotatable wheels 114 when the connecting element 140 is in the first position. During movement of the trolley 110 the messenger wire engagement structure 150 and connecting element 140 can move with the trolley 110 without contacting the messenger wire 102 running along the first messenger wire contact surface 116.

Figure 7:
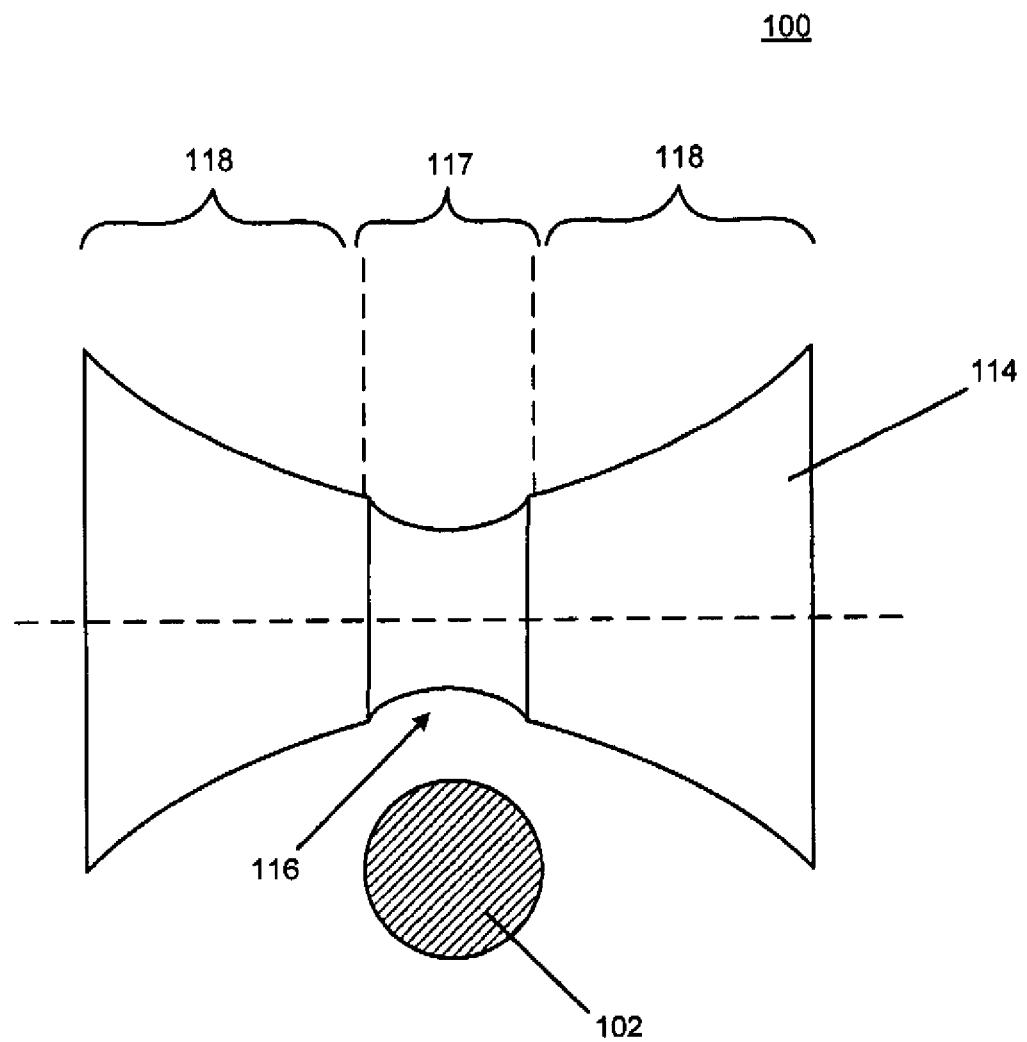
FIG. 7 is an exploded cross-sectional view illustration of the roller wheel and messenger wire of the roll-by spacer and trolley system, in accordance with the first exemplary embodiment of the present disclosure.

FIG. 7 is an exploded cross-sectional view illustration of the roller wheel 114 and messenger wire 102 of the roll-by spacer and trolley system 100, in accordance with the first exemplary embodiment of the present disclosure. The roller wheel 114 may have a variety of different sizes and surface dimensions. For example, the roller wheel 114 may have an interior wheel portion 117 having a first radial surface dimension and an exterior wheel portion 118 having a second radial surface dimension. The first and second radial surface dimensions may be the same or different. For example, as is shown in FIG. 7, the interior wheel portion 117 having a first radial surface dimension may have a smaller radial surface dimension than the exterior wheel portion 118. In other words, the interior wheel portion 117 may be sized with a smaller curvature on its surface than the exterior wheel portion 118.

As can be seen in FIG. 7, the interior wheel portion 117 may correspond to the portion of the rotatable wheel 114 where the messenger wire 102 runs along, which includes the first messenger wire contact surface 116. This difference in the surface radius dimensions between the interior and exterior wheel portions 117, 118 may assist with keeping the messenger wire 102 positioned centrally within the rotatable wheel 114, which may help prevent the messenger wire 102 from slipping outside of the rotatable wheel 114. Additionally, the difference in surface radius dimensions may also allow the rotatable wheel 114 to roll over other structures while at the same time stay in contact with the messenger wire 102. For example, the exterior wheel portions 118 of the rotatable wheel 114 may be sized to roll over a messenger clamp or other device affixed to the messenger wire 102. Of course, the specific radial surface dimensions and sizes of the rotatable wheel 114 may vary, all of which are considered within the scope of the present disclosure.

Figure 8:
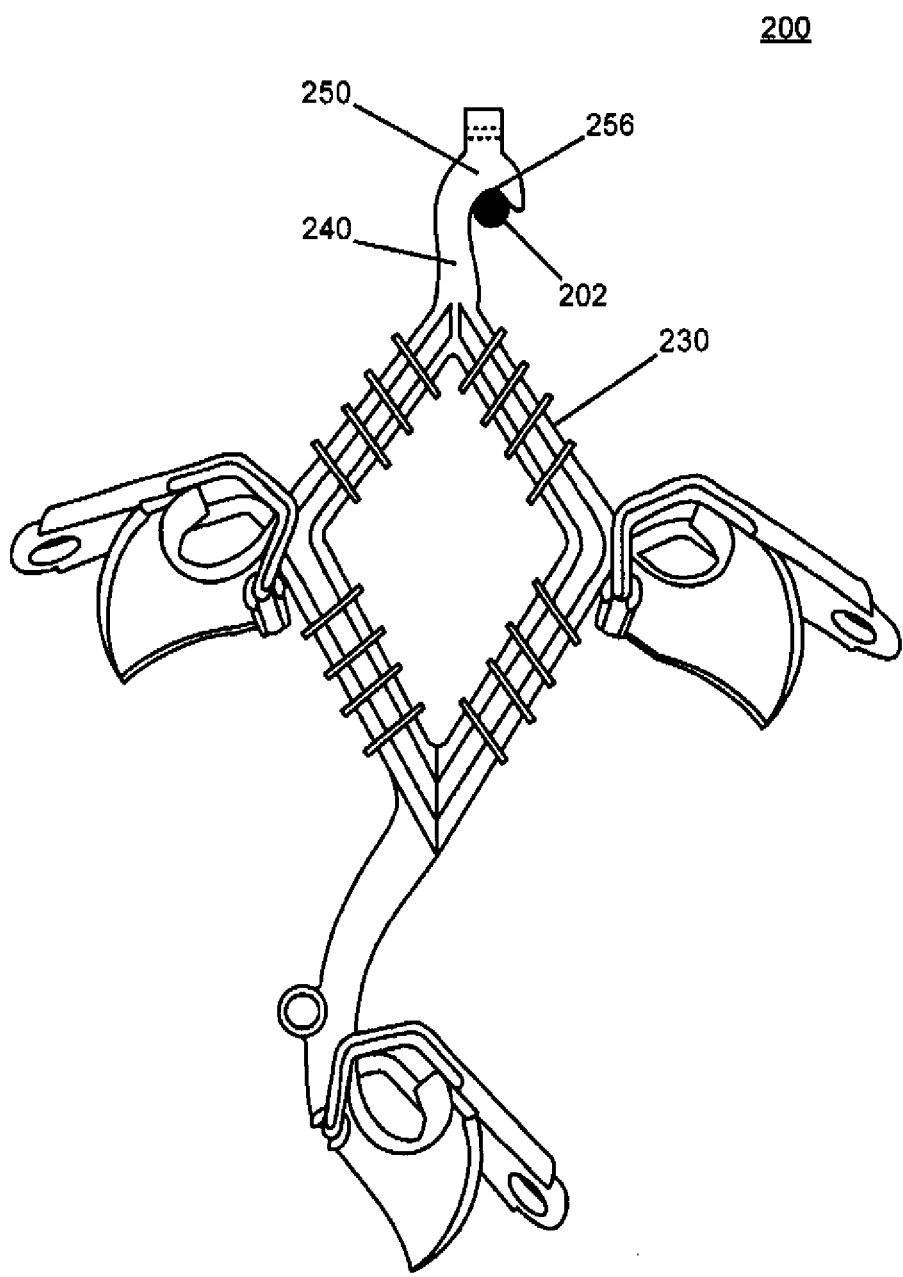
FIG. 8 is a side view illustration of a spacer of a roll-by spacer and trolley system, in accordance with a second exemplary embodiment of the present disclosure.

FIG. 8 is a side view illustration of a spacer 230 of a roll-by spacer and trolley system 200, in accordance with a second exemplary embodiment of the present disclosure. The roll-by spacer and trolley system 200 of the second exemplary embodiment, which may be referred to herein simply as 'system 200,' may be used with any of the devices of the other embodiments of the present disclosure, or any variations thereof. The system 200 of the second exemplary embodiment may be substantially similar to, and may include any of the components, features and characteristics of the system 100 of the first exemplary embodiment.

The spacer 230 of the system 200 includes a connecting element 240 and messenger wire engagement structure 250 that are integrally formed with the spacer 230. This allows the spacer 230 to be directly affixed to the messenger wire 202, where the messenger wire 202 contacts the second messenger wire contact surface 256. The functioning of the spacer 230 may be substantially similar to that of the first exemplary embodiment, but the combined structures of the connecting element 240 and messenger wire engagement structure 250 with the spacer 230 may allow for easier installation and use of the system 200. At the top of the connecting element 240, a connection feature such as a protrusion, may be formed, thereby allowing the spacer 230 to connect to a trolley (not shown).

Figure 9:
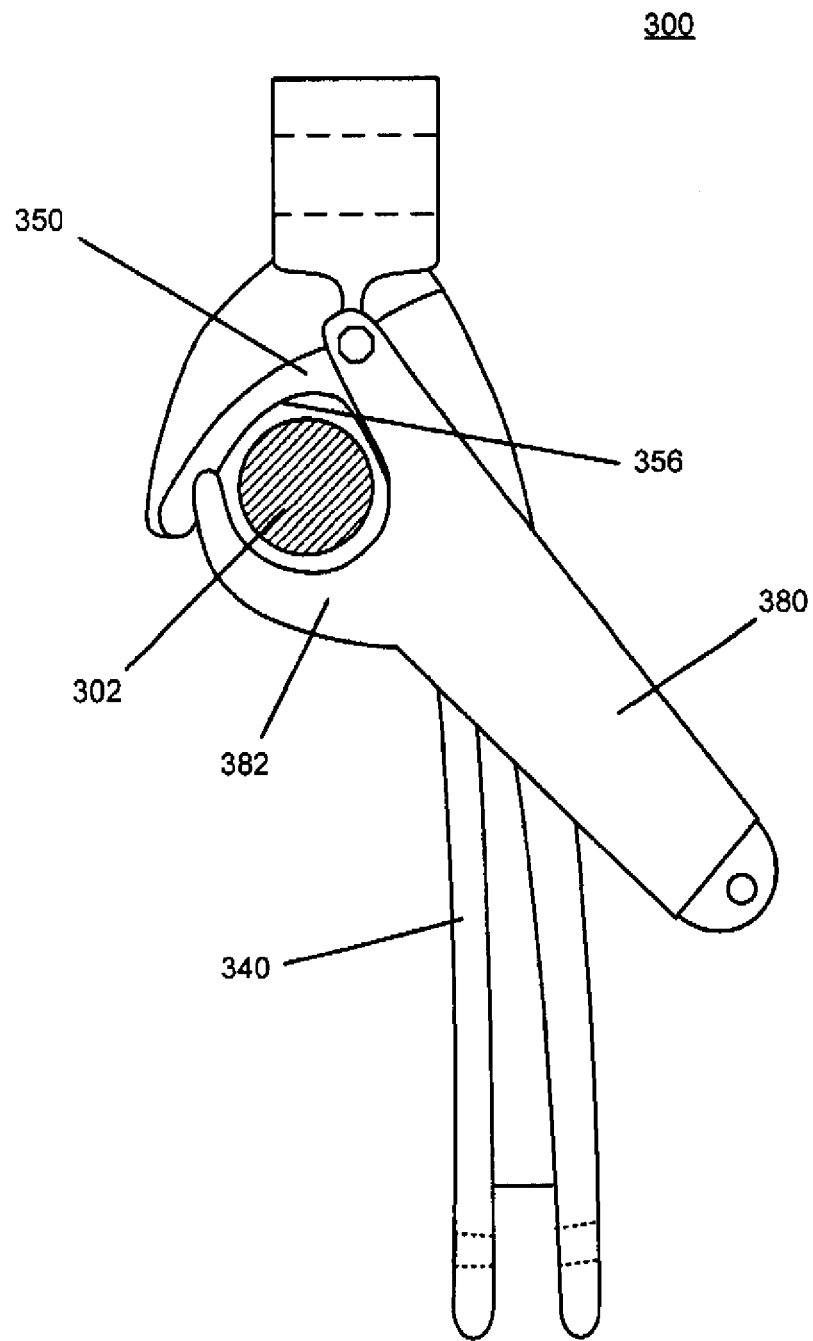
FIG. 9 is a side view illustration of a connecting element of a roll-by spacer and trolley system, in accordance with a third exemplary embodiment of the present disclosure.

FIG. 9 is a side view illustration of a connecting element 340 of a roll-by spacer and trolley system 300, in accordance with a third exemplary embodiment of the present disclosure. The roll-by spacer and trolley system 300 of the third exemplary embodiment, which may be referred to herein simply as 'system 300,' may be used with any of the devices of the other embodiments of the present disclosure, or any variations thereof. The system 300 of the third exemplary embodiment may be substantially similar to, and may include any of the components, features and characteristics of the systems of any of the exemplary embodiments disclosed herein.

The connecting element 340 may be used to connect to and be affixed to the messenger wire 302. As is shown, the connecting element 340 includes an integrally formed messenger wire engagement structure 350. A messenger wire 302 may be positioned within the messenger wire engagement structure 350 and may contact the second messenger wire contact surface 356. A locking device 380 on the messenger wire engagement structure 350 may include a retaining structure 382 which opposes the second messenger wire contact surface 356 to prevent the messenger wire 302 from being removed from the messenger wire engagement structure 350. As is shown, the locking device 380 may be hinged on the connecting element 340 and swivel around this hinge.

In use, once the messenger wire 302 is positioned within the messenger wire engagement structure 350, the locking device 380 may be moved such that the retaining structure 382 opposes the second messenger wire contact surface 356. The locking device 380 may then be retained in this position with any number or type of devices, such as ratchet teeth fasteners positioned between the locking device 380 and the connecting element 340. This positioning of the locking device 380 around the messenger wire 302 may prevent the messenger wire from becoming dislodged from the messenger wire engagement structure 350. For example, the locking device 380 may not be used during an installation of a cable since the connecting element 340 and messenger wire engagement structure 350 may need to be moved along the messenger wire 302. However, the locking device 380 may be used once the connecting element 340 is disconnected from the trolley and the connecting element 340 and messenger wire engagement structure 350 are being used to retain a spacer and cable permanently. Many variations on the locking device 380 may be included, all of which are considered within the scope of the present disclosure.

Figure 10A:
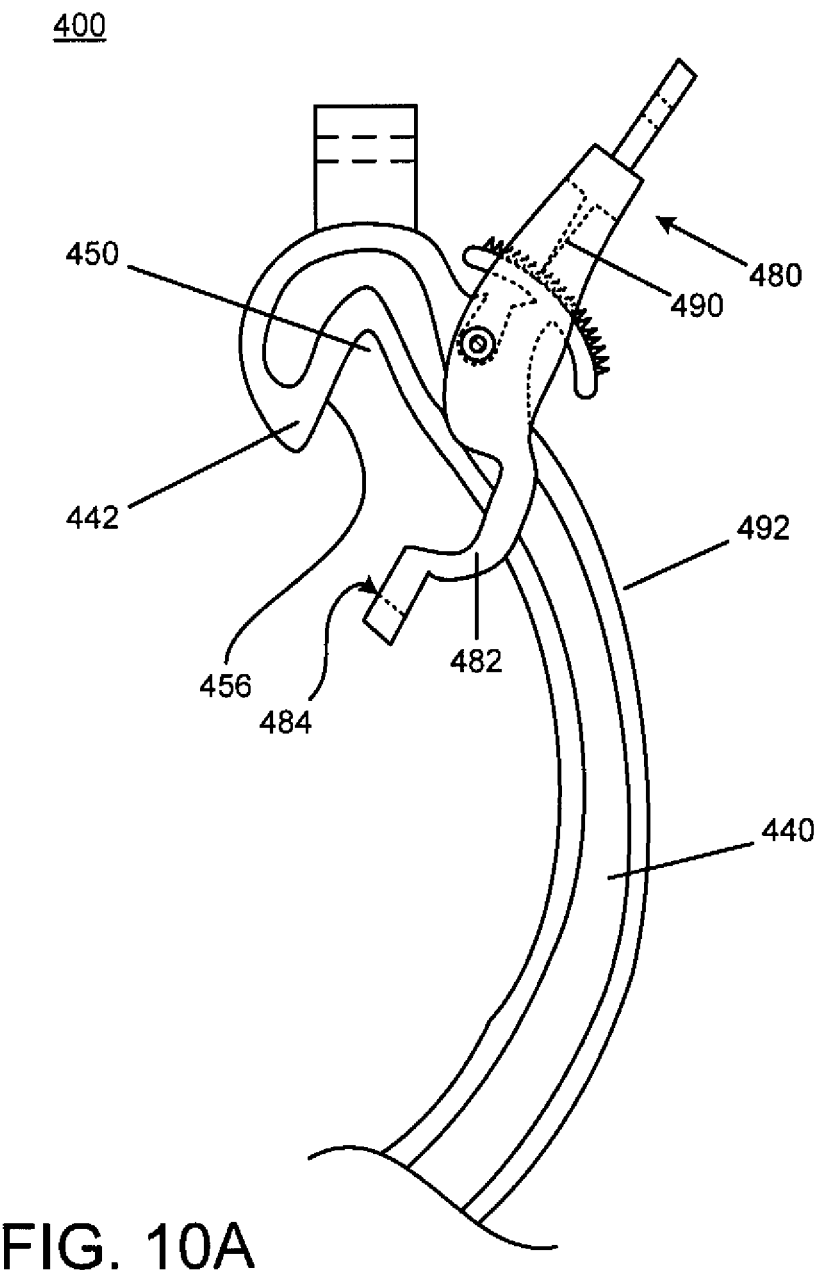
FIG. 10A is a side view illustration of a connecting element of a roll-by spacer and trolley system, in accordance with a fourth exemplary embodiment of the present disclosure.

FIG. 10A is a side view illustration of a connecting element 440 of a roll-by spacer and trolley system 400, in accordance with a fourth exemplary embodiment of the present disclosure. The roll-by spacer and trolley system 400 of the fourth exemplary embodiment, which may be referred to herein simply as 'system 400,' may be used with any of the devices of the other embodiments of the present disclosure, or any variations thereof. The system 400 of the fourth exemplary embodiment may be substantially similar to, and may include any of the components, features and characteristics of the systems of any of the exemplary embodiments disclosed herein.

The connecting element 440 may be used to connect to and be affixed to a messenger wire (not shown) via a messenger wire engagement structure 450. As is shown, the connecting element 440 includes an integrally formed messenger wire engagement structure 450, which may be a notch, or narrowed area of the upper part of the connecting element 440. The messenger wire engagement structure 450 may facilitate receipt of the messenger wire, and retain it therein against the messenger wire contact surface 456. A locking device 480 may be connected to the connecting element 440, such as with a pivotal connection 441 using a threaded fastener, and may have a retaining structure 482 that can be moved proximate to the messenger wire engagement structure 450. The locking device 480 may be moved to close retaining structure 482 on the messenger wire engagement structure 450 with the messenger wire therebetween, thereby retaining the messenger wire between the messenger wire engagement structure 450 and the retaining structure 482. As is shown in FIG. 10A, the retaining structure 482 may have a notched design that allows the messenger wire to be clamped down upon between the retaining structure 482 and the messenger wire contact surface 456. This configuration may prevent lateral sliding movement of the spacer on the messenger wire.

When the locking device 480 is in a closed position around the messenger wire, i.e., with the messenger wire clamped between the locking structure 482 and the messenger wire contact surface 456, an alignment structure 484 may be positioned about a tip 442 of the connecting element 440. For example, the alignment structure 484 may have a cutout portion that receives the tip 442 of the connecting element 440, thereby stabilizing the locking element 480 in place and preventing unwanted movement of the locking element 480. The cutout portion may extend from the alignment structure 484 to the handle 486 of the locking element 480, as is indicated with broken lines in FIG. 10A. In addition, the cutout portion may allow the locking element 480 to be retracted around the connecting element 440, as is shown in FIG. 10A, when it is moved from a closed position proximate to the messenger wire engagement structure 450.

To keep the locking element 480 in the closed position proximate to the messenger wire engagement structure 450, a tab 490 formed on the locking element 480 may engage with a plurality of locking notches 492 formed on the connecting element 440. As is shown in FIG. 10A, the locking notches 492 may be positioned on a platform 493, which is integral with the connecting element 440. The platform 493 may have various designs, including a raised, curved, or arced design, to provide proper positioning for engagement between the locking notches 492 and the tab 490. The tab 490 may be rigidly flexible such that it resists flexing and biasing against the locking notches 492. However, when the handle 486 of the locking element 480 is pivoted with a substantial force, the tab 490 may bend and move between the locking notches 492. As one skilled in the art can see, this configuration of the tab 490 and the locking notches 492 may allow the locking element 480 to be placed in a specific orientation pivotally about the connecting element 440. The locking device 480 may be retained in this position until the handle 486 is moved again. It is noted that the tab 490 and locking notches 492 may be referred to as a ratchet system or ratchet teeth, and may include any number of variations in design to movement of the locking element 480.

Also shown in FIG. 10A is the connecting element 440 with a larger offset portion than that shown in FIG. 4. The offset portion may be characterized as a central portion of the connecting element 440 that is spaced laterally from where the messenger wire engagement structure 450 is positioned. Thus, the offset portion allows the connecting element 440 to bow to one side of the various structures attached to the messenger wire, such as clamps, etc., as the spacer is being moved along the messenger wire on the trolley. This allows for movement of the spacer without contact between the connecting element 440 and the messenger wire, or structures attached thereto, when the trolley is being moved along the messenger wire. Any of the features disclosed with respect to the fourth exemplary embodiment may be included with any features, designs, or configurations of other exemplary embodiments herein. This may include, but is not limited to, having a connecting element 440 that is integral with a spacer.

Figure 10B:
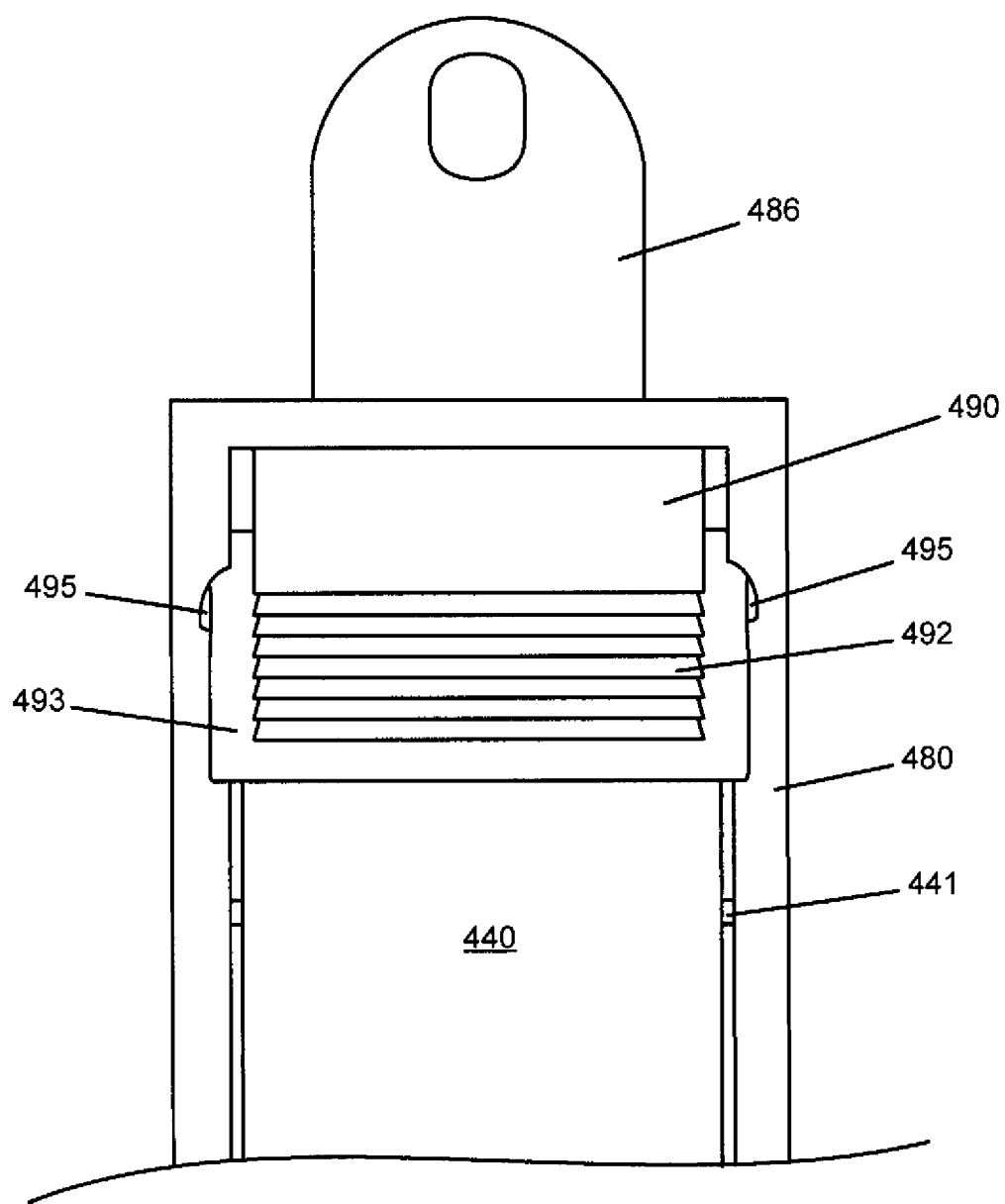
FIG. 10B is a rear view illustration of the tab and the locking notches of FIG. 10A, also including guiding slots positioned on the locking device, in accordance with the fourth exemplary embodiment of the present disclosure.

FIG. 10B is a rear view illustration of the tab 490 and the locking notches 492 of FIG. 10A, also including guiding slots 495 positioned on the locking device 480, in accordance with the fourth exemplary embodiment of the present disclosure. As is shown, the locking device 480 may have a set of guiding slots 495 that are formed therein and positioned to receive the platform 493. As the locking device 480 is pivoted about the pivotal connection 441, the edges of the platform 493 may be received within the guiding slots 495. This design may provide stability when the tab 490 engages with the locking notches 492 that are positioned on the platform 493, thereby allowing the locking device 480 to reliably lock into place. For example, the guiding slots 495 may prevent movement of the platform 493 when the tab 490 contacts the locking notches 492 and biases the platform 493. The guiding slots 495 may have a variety of different sizes, locations, or other configurations not explicitly discussed herein, all of which are considered within the scope of the present disclosure.

Figure 11:
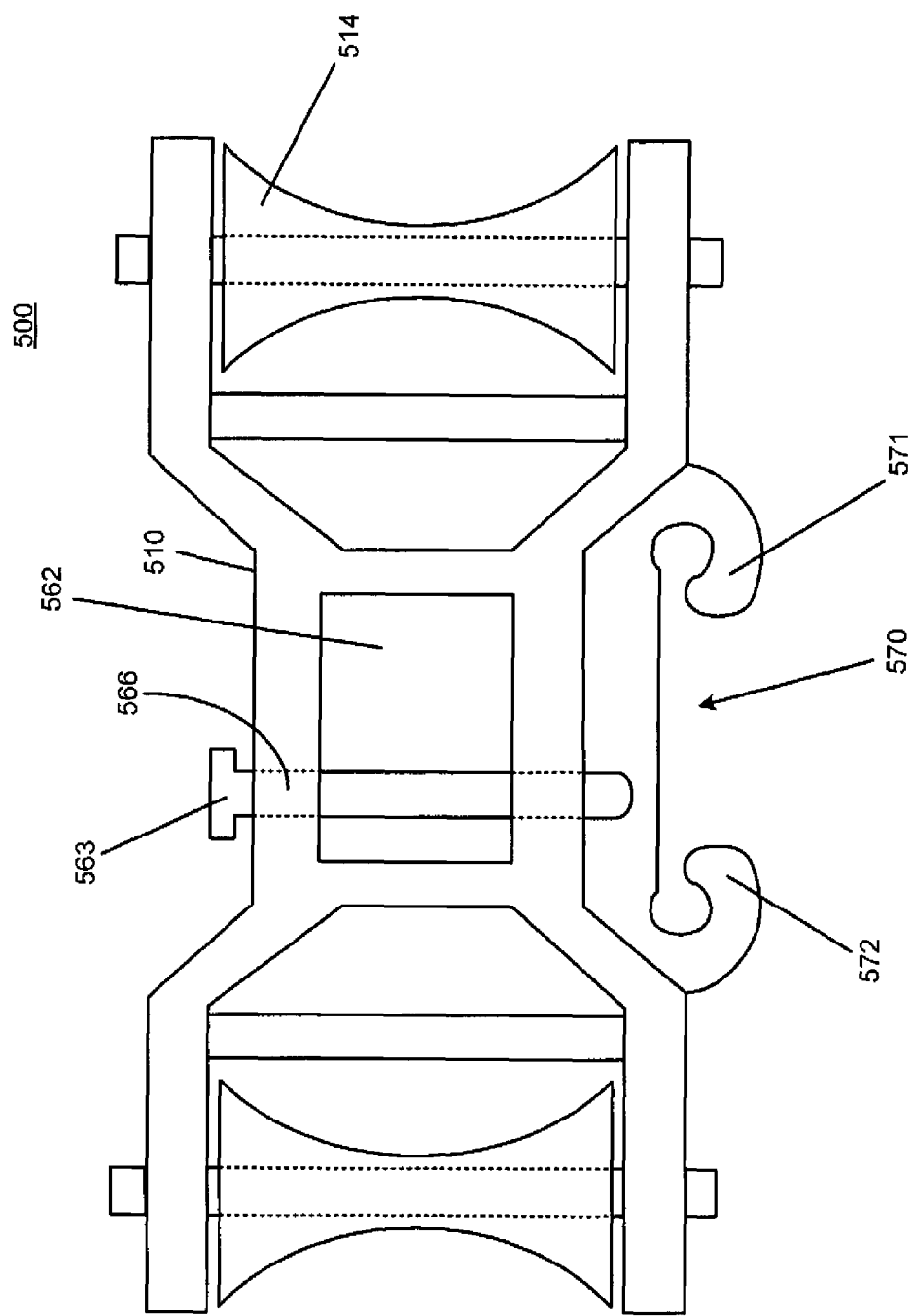
FIG. 11 is a top view illustration of a trolley of a roll-by spacer and trolley system, in accordance with a fifth exemplary embodiment of the present disclosure.
Figure 12:
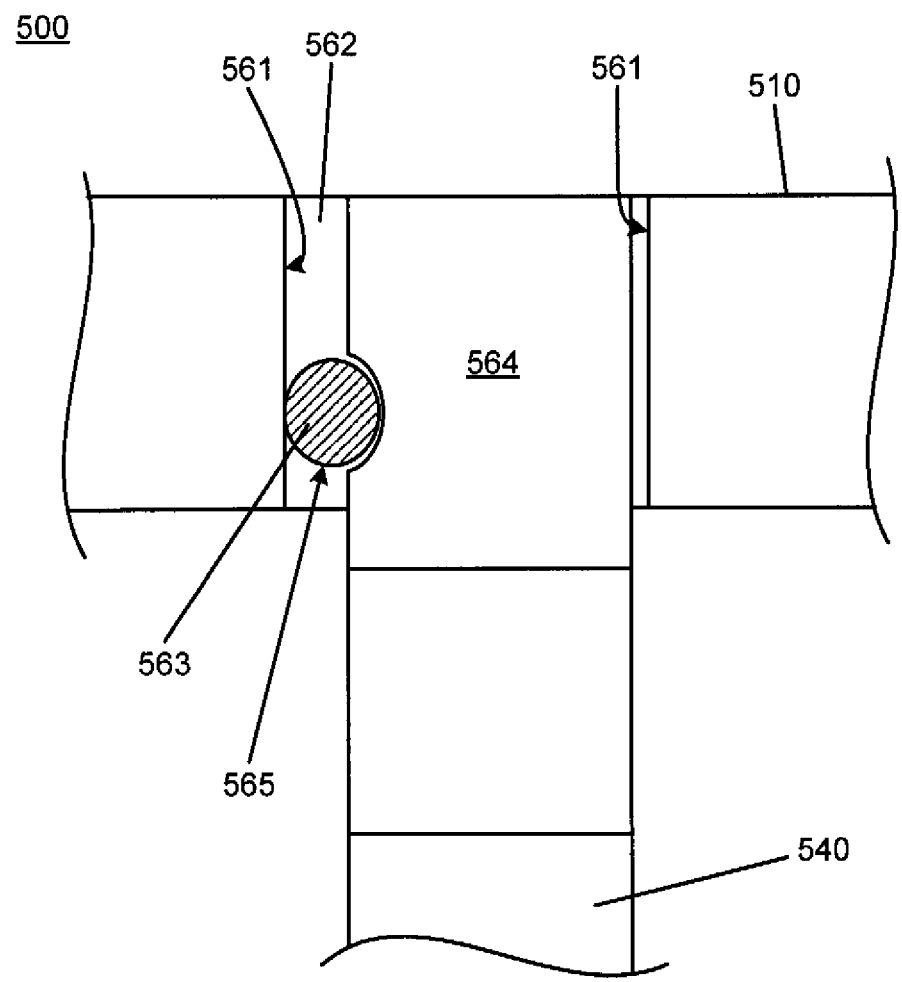
FIG. 12 is a side view illustration of the trolley and protrusion structure of the roll-by spacer and trolley system, in accordance with the fifth exemplary embodiment of the present disclosure.

FIG. 11 is a top view illustration of a trolley 510 of a roll-by spacer and trolley system 500, in accordance with a fifth exemplary embodiment of the present disclosure. FIG. 12 is a side view illustration of the trolley 510 and protrusion structure 564 of the roll-by spacer and trolley system 500, in accordance with the fifth exemplary embodiment of the present disclosure. The roll-by spacer and trolley system 500 of the fifth exemplary embodiment, which may be referred to herein simply as 'system 500,' may be used with any of the devices of the other embodiments of the present disclosure, or any variations thereof. The system 500 of the fifth exemplary embodiment may be substantially similar to, and may include any of the components, features and characteristics of the systems of any of the exemplary embodiments disclosed herein.

With reference to FIGS. 11-12, the trolley 510 may include a varied positioning of the pin locking structure that is used to retain the protrusion structure 564 (FIG. 12) within the receiving structure 562. The pin locking structure may utilize a pin 563 inserted in a notch 565 within the protrusion structure 564 and a hole 566 (FIG. 11) within the receiving structure 562 in a position that is offset from the center portion of the trolley 510. Thus, as opposed to the pin 563 being positioned within the center of the protrusion structure 564 and the receiving structure 562, the pin 563 may be positioned in a notch 565 on the side of the protrusion structure 564. The pin 563 may prevent the protrusion structure 564 from movement by holding the protrusion structure 564 between a sidewall 561 of the receiving structure 562 and the notch 565 within the side of the protrusion structure 564. This configuration may retain the protrusion structure 564 within the receiving structure 562, and thus be used to support the connecting element 540 from the trolley 510, as is discussed in detail with respect to FIG. 5.

FIG. 11 illustrates a line-pull structure 570 sized to connect to a tag line for moving the trolley 510 along the messenger wire. The line-pull structure 570 may include any structure or combination of structures that a tag line can be affixed to. For example, in FIG. 11, the line-pull structure 570 may include two hook structures 572 that a tag line can be affixed to. Once the tag line is affixed to the line-pull structure 570, a utility worker can move the tag line along the direction of the messenger wire to move the trolley 510. Accordingly, the line-pull structure 570 may allow the trolley 510 and any components of the system 500 suspended therefrom to be positioned at any location along the length of the messenger wire.

Figure 13:
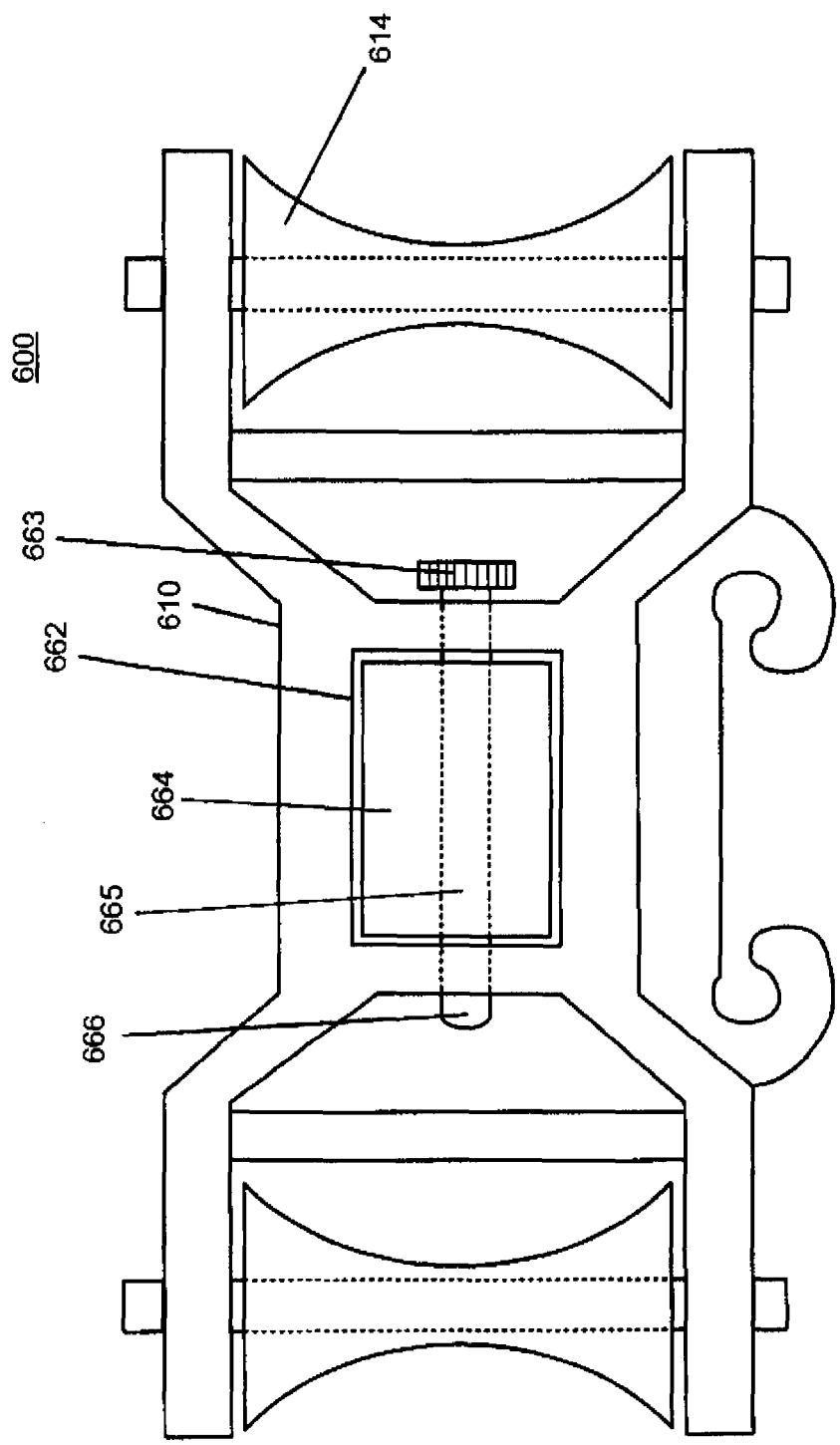
FIG. 13 is a top view illustration of a trolley of a roll-by spacer and trolley system, in accordance with a sixth exemplary embodiment of the present disclosure.

FIG. 13 is a top view illustration of a trolley 610 of a roll-by spacer and trolley system 600, in accordance with a sixth exemplary embodiment of the present disclosure. The roll-by spacer and trolley system 600 of the sixth exemplary embodiment, which may be referred to herein simply as 'system 600,' may be used with any of the devices of the other embodiments of the present disclosure, or any variations thereof. The system 600 of the sixth exemplary embodiment may be substantially similar to, and may include any of the components, features and characteristics of the systems of any of the exemplary embodiments disclosed herein. The trolley 610 may include a varied positioning of the pin locking structure that is used to retain the protrusion structure 664 within the receiving structure 662. The pin locking structure may utilize a pin 663 inserted in a hole 665 within the protrusion structure 664 and a hole 666 within the receiving structure 662. The holes 665, 666 may be in any position, preferably in a central position as is shown in FIG. 13.

In comparison to FIGS. 1-9 where the pin and holes are perpendicular to the length of the trolley, the pin 663 and holes 665, 666 in FIG. 13 are aligned with the length of the trolley 610. In other words, the pin 663 may be inserted through the receiving structure 662 and protrusion structure 664 from one of the trolley wheels 614 to the other 614. And unlike FIGS. 11-12 where the pin engages with a notch in the protrusion structure, in FIG. 13, the pin 663 may be inserted into the hole 665 within the protrusion structure 664. As with the other embodiments disclosed herein, the configuration of the pin 663 in the sixth exemplary embodiment may prevent the protrusion structure 664 from movement by holding the protrusion structure 664 within the receiving structure 562, and thus be used to support the connecting element 640 from the trolley 610, as is discussed in detail with respect to FIG. 5.

Figure 14:
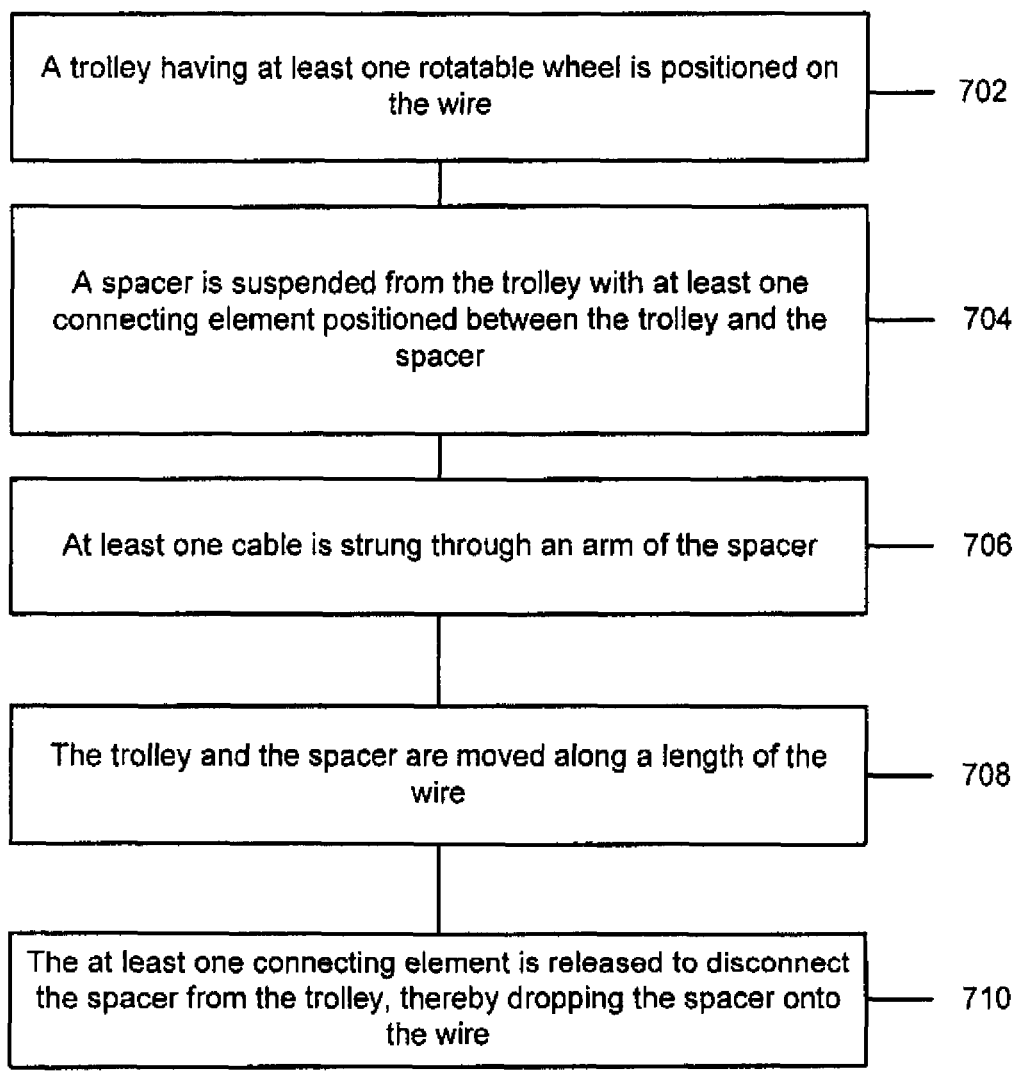
FIG. 14 is a flowchart illustrating a method of stringing a cable using a roll-by spacer and trolley system on a messenger wire, in accordance with the first exemplary embodiment of the disclosure.

FIG. 14 is a flowchart 700 illustrating a method of stringing a cable using a roll-by spacer and trolley system on a wire, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 702, a trolley having at least one rotatable wheel is positioned on the wire. A spacer is suspended from the trolley with at least one connecting element positioned between the trolley and the spacer (block 704). At least one cable is strung through an arm of the spacer (block 706). The trolley and the spacer are moved along a length of the wire (708). The at least one connecting element is released to disconnect the spacer from the trolley, thereby dropping the spacer onto the wire (block 710).

The method may include any additional number of steps or variations thereof, which includes any of the functioning or structures discussed with respect to FIGS. 2-13. For example, the connecting element may be locked to retain the spacer in a substantially stationary position along the messenger wire. When releasing the at least one connecting element, a pin engaged between the spacer and the trolley may be removed or released, which may be done with a pin removal device controlled from a remote position. When the trolley is being moved, the trolley having the suspended spacer may be rolled over a messenger wire clamp. Similarly, while the trolley is being moved the second messenger wire contact surface may be kept or retained above the first messenger wire contact surface.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A roll-by spacer and trolley system for use with a wire comprising:
   a trolley having at least a rotatable wheel, wherein the rotatable wheel has a first wire contact surface positioned to contact and roll along the wire;
   a spacer removably suspended from the trolley with at least one connecting element positioned between the trolley and the spacer, wherein the connecting element has at least a first position wherein the trolley and spacer are connected and a second position wherein the trolley and spacer are disconnected; and
   a hook-shaped wire engagement structure formed at a distal end of the connecting element, the hook-shaped wire engagement structure having a second wire contact surface positioned on a ceiling of a cavity having opposing sidewalls descending from the ceiling, wherein the second wire contact surface is positioned to contact the wire when the connecting element is in the second position, wherein the second wire contact surface is positioned above the first wire contact surface when the connecting element is in the first position.

2. The roll-by spacer and trolley system for use with a wire of claim 1, wherein the at least one connecting element is removably connected to the spacer.

3. The roll-by spacer and trolley system for use with a wire of claim 1, wherein the at least one connecting element is integrally connected to the spacer.

4. The roll-by spacer and trolley system for use with a wire of claim 1, wherein the at least one connecting element further comprises an offset portion, wherein the offset portion bows to one side of the wire.

5. The roll-by spacer and trolley system for use with a wire of claim 1, wherein the trolley further comprises a yoke having a first pair of arms supporting the at least one rotatable wheel, wherein the yoke is positioned at least partially directly above the cavity.

6. The roll-by spacer and trolley system for use with a wire of claim 1, wherein the at least one connecting element further comprises a protrusion structure formed within the connecting element and positioned above the hook-shaped wire engagement structure, and wherein a receiving structure is formed within the trolley, wherein the protrusion structure is inserted within the receiving structure when the connecting element is in the first position, wherein the protrusion structure is removable in a vertical direction from the receiving structure when moved from the first position to the second position.

7. The roll-by spacer and trolley system for use with a wire of claim 6, further comprising a pin locking the protrusion structure within the receiving structure when the connecting element is in the first position.

8. The roll-by spacer and trolley system for use with a wire of claim 7, further comprising a pin removal device affixed to the pin, wherein the pin removal device facilitates removal of the pin from a remote position.

9. The roll-by spacer and trolley system for use with a wire of claim 1, further comprising a line-pull structure within the trolley, wherein the line-pull structure is sized to connect to a tag line for moving the trolley along the wire.

10. The roll-by spacer and trolley system for use with a wire of claim 1, further comprising a locking device on the hook-shaped wire engagement structure, wherein placing the locking device in a locked position retains the hook-shaped wire engagement structure in a substantially stationary position along the wire.

11. The roll-by spacer and trolley system for use with a wire of claim 1, wherein the first wire contact surface of the at least one rotatable wheel further comprises an interior wheel portion having a first radial surface dimension, wherein an exterior wheel portion having a second radial surface dimension is position exterior of the interior wheel portion.

12. The roll-by spacer and trolley system of claim 1, wherein a distance between the opposing sidewalls of the cavity is less than a width of the rotatable wheel of the trolley.

13. A method of stringing a cable using a roll-by spacer and trolley system on a wire, the method comprising the steps of:
    positioning a trolley having at least one rotatable wheel on the wire;
    suspending a spacer from the trolley with at least one connecting element positioned between the trolley and the spacer;
    stringing at least one cable through an arm of the spacer;
    moving the trolley and the spacer along a length of the wire; and
    releasing the at least one connecting element to disconnect the spacer from the trolley, thereby dropping the spacer onto the wire, whereby the wire contacts a wire contact surface positioned on a ceiling of a cavity of a hook-shaped wire engagement structure, wherein the cavity has opposing sidewalls descending from the ceiling.

14. The method of claim 13, further comprising the step of retaining the at least one cable within the arm of the spacer with at least one retaining mechanism.

15. The method of claim 13, further comprising the step of locking the at least one connecting element to the wire, wherein the locked connecting element retains the spacer in a substantially stationary position along the wire.

16. The method of claim 13, wherein the step of releasing the at least one connecting element further comprises releasing at least one pin engaged between the spacer and the trolley.

17. The method of claim 16, wherein the step of releasing the at least one pin engaged between the spacer and the trolley further comprises the step of removing the at least one pin from a remote position with a pin removal device affixed to the at least one pin.

18. The method of claim 13, wherein the step of moving the trolley and spacer along the length of the wire further comprises connecting a tag line to a line-pull structure on the trolley.

19. The method of claim 13, wherein the step of moving the trolley and spacer along the length of the wire further comprises rolling over a wire clamp with the trolley and suspended spacer.

20. A roll-by spacer for use with a transmission and distribution system comprising:
    a spacer body having a plurality of arms sized to receive and carry a cable;
    a connecting element connected to the spacer body at a connection point within a proximal end of the connecting element;
    a hook-shaped wire engagement structure integrally formed within the connecting element at a distal end of the connecting element, wherein the hook-shaped wire engagement structure has a wire contact surface positioned on a ceiling of a cavity having opposing sidewalls descending from the ceiling;
    an offset portion within a middle of the connecting element, wherein the middle of the connecting element is positioned between the proximal and distal ends, and wherein the offset portion is positioned nonlinear relative to the connection point and the hook-shaped wire engagement structure; and a trolley connecting structure formed proximate to the distal end of the connecting element, wherein the trolley connecting structure is engageable with a trolley.

* * * * *